United States Patent
Geiselhart et al.

(10) Patent No.: US 11,734,085 B2
(45) Date of Patent: Aug. 22, 2023

(54) MANAGING CONCURRENT ACCESSES BY A SET OF TASKS TO A SHARED RESOURCE OF A COMPUTER SYSTEM

(71) Applicant: International Business Machines Corporation, Armonk, NY (US)

(72) Inventors: Reinhold Geiselhart, Rottenburg-Ergenzingen (DE); Knut Stolze, Hummelshain (DE); Felix Beier, Haigerloch (DE); Luis Eduardo Oliveira Lizardo, Böblingen (DE)

(73) Assignee: International Business Machines Corporation, Armonk, NY (US)

( * ) Notice: Subject to any disclaimer, the term of this patent is extended or adjusted under 35 U.S.C. 154(b) by 412 days.

(21) Appl. No.: 16/801,512

(22) Filed: Feb. 26, 2020

(65) Prior Publication Data
US 2021/0263786 A1    Aug. 26, 2021

(51) Int. Cl.
| G06F 9/52 | (2006.01) |
| G06F 9/54 | (2006.01) |
| G06F 9/48 | (2006.01) |
| G06F 9/50 | (2006.01) |
| G06F 11/36 | (2006.01) |

(52) U.S. Cl.
CPC .......... G06F 9/524 (2013.01); G06F 9/4837 (2013.01); G06F 9/4881 (2013.01); G06F 9/5022 (2013.01); G06F 9/52 (2013.01); G06F 9/546 (2013.01); G06F 11/3632 (2013.01)

(58) Field of Classification Search
CPC .. G06F 11/3632; G06F 9/4837; G06F 9/5022; G06F 9/546; G06F 9/52–548; G06F 11/36–3696
See application file for complete search history.

(56) References Cited

U.S. PATENT DOCUMENTS

| 8,997,101 B2 | 3/2015 | Omara |
| 9,069,894 B2 | 6/2015 | Erickson |
| 9,135,082 B1* | 9/2015 | Sheng ..................... G06F 11/36 |
| 9,582,324 B2 | 2/2017 | Alexander |
| 11,113,178 B2* | 9/2021 | Bryan ................. G06F 11/3632 |

(Continued)

FOREIGN PATENT DOCUMENTS

WO    WO-2017019113 A1 *  2/2017

OTHER PUBLICATIONS

Eraser: A Dynamic Data Race Detector for Multithreaded Programs Stefan Savage, Michael Burrows, Greg Nelson, and Patrick Sobalvarro (Year: 1997).*

(Continued)

Primary Examiner — Emerson C Puente
Assistant Examiner — Paul V Mills
(74) Attorney, Agent, or Firm — Stephen R. Yoder (57) ABSTRACT

Managing concurrent accesses by a set of tasks to a shared resource of a computer system. Synchronizing the set of tasks for assigning and releasing a resource according to a predefined access period with flexibility of providing an extended access period where an external task is not detected during the predefined access period. Where an extended access period is provided, resynchronizing is performed, and the external task is identified and access is prevented when the external task is determined to be a particular type of task.

20 Claims, 4 Drawing Sheets

(56) References Cited

U.S. PATENT DOCUMENTS

| | | | |
|---|---|---|---|
| 2010/0050161 A1* | 2/2010 | Nir-Buchbinder | G06F 9/44589 717/126 |
| 2010/0131931 A1* | 5/2010 | Musuvathi | G06F 11/366 717/128 |
| 2011/0010693 A1* | 1/2011 | Kahlon | G06F 11/3608 717/133 |
| 2011/0314338 A1* | 12/2011 | Erickson | G06F 11/3636 711/147 |
| 2012/0204062 A1* | 8/2012 | Erickson | G06F 11/3636 714/E11.029 |
| 2018/0276046 A1 | 9/2018 | Joao | |
| 2020/0210318 A1* | 7/2020 | Bryan | G06F 11/3632 |

OTHER PUBLICATIONS

Noise Injection Heuristics for Concurrency Testing Bohuslav Krena, Zdenek Letko, and Tomas Vojnar (Year: 2012).*

Process Synchronization in Multiprocessor and Multi-core Processor Mohammed Mahmudur Rahman (Year: 2012).*

Multithreaded Java program test generation O. Edelstein; E. Farchi; Y. Nir; G. Ratsaby; S. Ur (Year: 2002).*

Advances in Noise-based Testing of Concurrent Software J. Fiedor, V. Hruba, B. Krena, Z. Letko, S. Ur, and T. Vojnar (Year: 2013).*

Effective Data-Race Detection for the Kernel John Erickson, Madanlal Musuvathi, Sebastian Burckhardt, Kirk Olynyk (Year: 2010).*

RaceTrack: Efficient Detection of Data Race Conditions via Adaptive Tracking Yuan Yu, Tom Rodeheffer, Wei Chen (Year: 2005).*

AtomRace: Data Race and Atomicity Violation Detector and Healer Zdenek Letko, Tomáš Vojnar, Bohuslav Krena (Year: 2008).*

Improving the Accuracy of Data Race Detection Robert H. B. Netzer and Barton P. Miller (Year: 1991).*

ConditionR a Static Data Race Detection Tool for C++11 Silvano Brugnoni Master's Thesis, University of Applied Sciences Rapperswil (Year: 2015).*

Effective Data-Race Detection for the Kernel John Erickson, Madanlal Musuvathi, Sebastian Burckhardt, Kirk Olynyk OSDI'10: Proceedings of the 9th USENIX conference on Operating systems design and implementation (Year: 2010).*

* cited by examiner

MANAGING CONCURRENT ACCESSES BY A SET OF TASKS TO A SHARED RESOURCE OF A COMPUTER SYSTEM

BACKGROUND

The present invention relates to the field of digital computer systems, and more specifically, to a method for managing concurrent accesses by a set of tasks to a shared resource of a computer system.

Writing software that is multi-threaded or multi-process-enabled is a common approach nowadays. It is not only strongly recommended by the parallel architecture of modern processors; it is in addition strongly required in modern software architectures to guarantee responsive user front ends.

SUMMARY

In one aspect of the present invention, a method, a computer program product, and a system for managing concurrent accesses by a set of tasks to a shared resource of a computer system includes: (A) synchronizing a set of tasks including: (i) assigning a shared resource to each task of the set of tasks at a time during an access time period, the access time period having a start time $t_{start}$ and an end time $t_{end}^0$, the assigning including: (a) responsive to receiving from the task an access request, determining to grant access to the task at $t_{start}$; (b) executing a resource assigning step at a point of time $t_{enable}^0$; and (c) executing a resource releasing step at the point of time $t_{end}^0$, (ii) wherein a duration of the access time period exceeds a predefined duration for detecting an external task trying to access the shared resource, the external task not being within the set of tasks; (B) responsive to the duration of the access time period exceeding the predefined duration, delaying the resource assigning step by a first delay period $\Delta t_1^j$ such that $t_{enable}^j = t_{enable}^0 + \Delta t_1^j$, and/or delaying the resource releasing step by a second delay period $\Delta t_2^j$ such that $t_{end}^j = t_{end}^0 + \Delta t_2^j$, thereby extending the access time period by a delay period $\Delta t^j$ to create an extended access time interval; (C) resynchronizing the set of tasks during the extended access time interval; (D) identifying an external task that is trying to access the shared resource during the extended access time interval; and (E) configuring the computer system for preventing accesses to the shared resource by external tasks having a type of the identified external task.

Various embodiments provide a method for managing concurrent accesses by a set of tasks to a shared resource of a computer system, computer system and computer program product as described by the subject matter of the independent claims. Advantageous embodiments are described in the dependent claims. Embodiments of the present invention can be freely combined with each other if they are not mutually exclusive.

In one aspect, the present invention relates to a method for managing concurrent accesses by a set of tasks to a shared resource of a computer system. The method comprises: (i) providing a synchronization module configured for synchronizing the set of tasks comprising assigning the shared resource to each task of the set of tasks at a time and during an access time period, the access time period having a start time $t_{start}$ and an end time $t_{end}^0$, the assigning comprising in response to receiving from the task an access request, deciding to grant access to the task at $t_{start}$, executing a resource assigning step at a point of time $t_{enable}^0$, executing a resource releasing step at the point of time $t_{end}^0$, wherein the duration of the access time period is insufficient to detect an external task trying to access the shared resource, the external task being not part of the set of tasks and not synchronized by the synchronization module; (ii) reconfiguring the synchronization module comprising: delaying the resource assigning step by a first delay period $\Delta t_1^j$ such that $t_{enable}^j = t_{enable}^0 + \Delta t_1^j$, and/or delaying the resource releasing step by a second delay period $\Delta t_2^j$ such that $t_{end}^j = t_{end}^0 + \Delta t_2^j$, thereby extending the access time period by a delay period $\Delta t^j$; (iii) executing the reconfigured synchronization module; (iv) identifying an external task that is trying to access the shared resource during the extended access time interval; and (v) configuring the computer system for preventing accesses to the shared resource by external tasks having a type of the identified external task.

In another aspect, the present invention relates to a computer program product comprising a computer-readable storage medium having computer-readable program code embodied therewith, the computer-readable program code configured to implement all of steps of the method according to preceding embodiments.

In another aspect, the present invention relates to a computer system comprising a synchronization module configured for synchronizing a set of tasks comprising assigning the shared resource to each task of the set of tasks at a time and during an access time period, the access time period having a start time $t_{start}$ and an end time $t_{end}^0$, the assigning comprising in response to receiving from the task an access request, deciding to grant access to the task at $t_{start}$, executing a resource assigning step at a point of time $t_{enable}^0$, executing a resource releasing step at the point of time $t_{end}^0$, wherein the duration of the access time period is insufficient to detect an external task trying to access the shared resource, the external task being not part of the set of tasks and not synchronized by the synchronization module.

The computer system is configured for: (i) reconfiguring the synchronization module comprising: delaying the resource assigning step by a first delay period $\Delta t_1^j$ such that $t_{enable}^j = t_{enable}^0 + \Delta t_1^j$, and/or delaying the resource releasing step by a second delay period $\Delta t_2^j$ such that $t_{end}^j = t_{end}^0 + \Delta t_2^j$, thereby extending the access time period by a delay period $\Delta t^j = \Delta t_1^j + \Delta t_2^j$; (ii) executing the reconfigured synchronization module; (iii) identifying an external task that is trying to access the shared resource during the extended access time interval; and (iv) configuring the computer system for preventing accesses to the shared resource by external tasks having a type of the identified external task.

BRIEF DESCRIPTION OF THE SEVERAL VIEWS OF THE DRAWINGS

In the following embodiments of the present invention are explained in greater detail, by way of example only, making reference to the drawings in which.

DETAILED DESCRIPTION

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Some embodiments of the present invention recognize that there is need to improve test phases of multi-threaded or multi-process-enabled software.

Managing concurrent accesses by a set of tasks to a shared resource of a computer system. Synchronizing the set of tasks for assigning and releasing a resource according to a predefined access period with flexibility of providing an extended access period where an external task is not detected during the predefined access period. Where an extended access period is provided, resynchronizing is performed, and the external task is identified and access is prevented when the external task is determined to be a particular type of task.

A problem with multi-threaded programming may be found in timing issues such as race conditions. Race conditions may, for example, be caused by a concurrent manipulation of shared mutable data. Race conditions may result in disastrous bugs which are hard to discover, to reproduce and to debug. To cope with this and provide help to programmers and system designers, techniques (e.g. systems and applications) may be established in software programming to keep concurrent tasks under control. These techniques may, for example, use semaphores, such as "MUTEX" items. However, before these techniques can be used in a production phase, another problem may be found in the verification or testing of such techniques during a test phase. For example, testing of concurrent tasks and processes may be very expensive, since many possible constellations and timings had to be prepared and tested. In addition, this testing may be very long-lasting since defects and system crashes are most often found very late in the test phases. The present subject matter may enable a testing approach that solves these high and time-consuming issues. The present subject matter may address critical touch points of multi-threaded and/or multi-process-based systems and programs by improving the test coverage by order of magnitude. Instead of only testing the synchronization capabilities of such techniques based on a granularity defined outside, the present subject matter enables to do such tests on a pervasive basis and thereby improving the granularity.

For example, whenever a synchronization between different concurrent tasks or processes is needed, one or more tasks have to wait for one or more other tasks to complete their subtask first, before the tasks put on hold are allowed to continue. In an error-free software implementation these wait- and/or lock-mechanisms are established in a way, that even extreme timing differences cannot crash a system/process or lead to a wrong behavior and wrong results. However, in case these synchronization points are not implemented correctly, rare bug situations can go undetected for very long, just because the usual timing is within a certain limited range and does not cause a conflict with such bug situations. The present subject matter enables to change these timings to a bigger extend then an error behavior of such rare bug may be detected. The timing of the synchronization may be controlled from outside and in a pervasive way. By this, extreme timings of concurrent tasks can be enforced, and the system behavior can be examined under such rare but possible bug situations.

The method may be performed during a test phase, wherein the number of tasks of the set of tasks may be smaller than a maximum number of test tasks. For example, the time gap between two consecutive accesses to the shared resource by respective consecutive tasks of the set of tasks may be higher than, or exceed, a predefined threshold. The present subject matter may improve a bug or error detection efficiency during this test phase of the synchronization module. The detection efficiency of the external tasks may be improved when the access time period is extended. Indeed, the external task may change data in the shared resource. This change may affect the output and/or input of the task. However, the affected output may have to be detected before a next task of the set of tasks accesses the shared resource. This is because the next task may further change that output so that it may be not possible to find out that the external task has made a change in the output of the task. In addition, the detection or identification of the external task may not be enabled during time gaps (e.g. in time interval $[t_{end}^j, t_{start}^{j+1}]$) between two consecutive accesses of tasks j and j+1 of the set of tasks. Therefore, by extending the access time period, the external task may, for example, be detected even after the task has requested the release of the resource and before the resource is released for the task or during the period $[t_{start}^{j+1}, t_{enable}^{j+1}]$ of a next task following the task.

The detection of the external task may be performed by, for example, repeatedly determining a value, such as a hash value, that uniquely identifies data of the shared resource e.g. immediately after performing an access (e.g. a write or read) by the task to the shared resource. The hash value may be determined during the access time period of the task. By comparing the determined hash values, it may be determined that an external task has changed the content of the shared resource.

The detection efficiency may also increase as the access to the shared resource is shifted. Indeed, the extension of the access time period results in a shift of the time during which the shared resource is accessed by the task. It also results in a shift of the time during which the shared resource is accessed by further tasks. Thus, by applying the delays $\Delta t_1^j$ and/or $\Delta t_2^j$, the whole timing pattern of access to the shared resource may be adjusted so that it is unpredictable. By adjusting the timing pattern, a probability of collisions between external tasks and the set of tasks may increase. A collision may, for example, mean that either two or more tasks are modifying information of the shared resource at the same time, or are reading data while it is modified by another task, which turns either the data itself to be corrupted, or returns at least corrupted information to the reading task in the latter case. The collision may also occur if an external task changes data during the time period $[t_{relreq}, t_{end}^j]$ or $[t_{start}, t_{enable}^j]$.

A task of the set of tasks may be a unit of work to perform an intended function. The task may be provided as a logic program or set of instructions for realizing the intended function. An example of a task may be a process or a thread. The task may have a task type or task category. For example, the task may be a SQL (structured query language) script and the set of tasks may comprise payroll-related tasks. In this case, the task type may, for example, be named "Payroll" type. Each task of the set of tasks may be associated with an identifier. Each task of the set of tasks may access the shared resource following a defined timing pattern, e.g. every hour. The delay applied to the resource assigning step and/or resource releasing step may be task dependent. That is, for each task of the set of tasks a respective delay period may be applied.

In one example, the delay may be performed differently for each two consecutive tasks of the set of tasks. For example, if the resource assigning step is delayed for a first task, the resource releasing step may be delayed for the following task. In another example, if the resource releasing step is delayed for a first task, the resource assigning step may be delayed for the following task. If the resource assigning step and the resource releasing step are delayed for a first task, the resource releasing step or the resource assigning step may be delayed for the following task. This alternation process may enable a flexible control of the timing patterns of the set of tasks and may render the timing patterns more unpredictable.

According to one embodiment, the first and second delay periods are the same or different. The delay period $\Delta t^j$ may for example be defined as follows: $\Delta t^j = \Delta t_1^j + \Delta t_2^j$, $\Delta t^j = \Delta t_1^j$ or $\Delta t^j = \Delta t_2^j$ depending on which one or more steps of the resource assigning and resource releasing steps are delayed. Using different first and second delay periods may enable a flexible control of the synchronization process. Using the same value for the first and second delay periods may enable a systematic and simplified control of the synchronization, e.g., because a single value of the first and second delay periods is used instead of two values.

According to one embodiment, the delay period comprises a fixed delay. For example, the delay period may be the same for each task of the set of tasks. This may enable a consistent processing of the set of tasks. This may particularly be advantageous in case the set of tasks are of the same type.

According to one embodiment, the delay period comprises a variable delay computed for each task of the set of tasks based on a random value. For example, the delay period may be (re)computed for each task of the set of tasks using a different random value. This may particularly be advantageous in case the set of tasks are tasks of different types.

According to one embodiment, the method comprises: determining a task type of the task and determining the delay period based on the task type. For example, a delay period may be defined for each task type of a set of predefined set of task types. The delay period of a given task type may be defined so that it can enable to detect suspicious external tasks that run in parallel to a task of the given task type. These defined delay periods may be stored so that they can be used, in this embodiment, in order to determine the delay period of the task being processed. This embodiment may enable an accurate definition of delay periods and may further increase the detection efficiency of the external tasks.

According to one embodiment, the method further comprises executing the synchronization module using calibration tasks and generating a timing pattern information indicative of time gaps between consecutive accesses to the shared resource by different calibration tasks, wherein the delay period is determined using the timing pattern information. This embodiment may enable an accurate definition of delay periods and may further increase the detection efficiency of the external tasks. In particular, additional timing injections (the additional timing injection may be the delay period) may be steered in a way, that only normal gaps time spans are used to artificially enlarge the lock timings. By this approach, an immediate stop of the system can be avoided, because the pervasive timing injections are limited in a way to not exceed gap boundaries that can stop the system.

The timing pattern information may, for example, be determined in case of a lock-based synchronization module as follows. The computer system may be under test so that it is observed for some time to learn normal variances in timings with regard to the locking mechanism enabled by the synchronization module of the computer system. Metadata is collected in a first step from all locking manager calls to create a history of the system in terms of "which concurrent task requested access to which resource at which point in time." In a second phase and derived from the lock pattern created in the first step, calculation is done about the "normal gaps" of all concurrent tasks, e.g., when tasks do not own a lock handle. The collected timings information may include any form and/or levels of tracing. Collecting information on the tracing may be advantageous because tracing can change timing diagrams and hidden race conditions significantly.

According to one embodiment, the delay period is smaller than the smallest time gap indicated in timing pattern information. This embodiment may prevent system crashes that may be caused by inappropriate waiting times. The timing patterns of the task which have been collected together with the correlated stack-trace information of the task, may indicate which line of code in which function-call stack of the task is performing individual calls to the lock manager. Using this combined information, a maximum delay may be defined. The maximum delay may not exceed the time between the current request and the next request of the task, which would occur in the normal operation mode. The maximum delay may be injected to a current resource assigning step and/or resource releasing step of the task.

According to one embodiment, the synchronization module is configured to perform the synchronization using a semaphore associated with the shared resource, the semaphore comprising a lock, wherein the resource assigning step comprises sending a message indicting a granting access to the lock, and wherein the resource releasing step comprises releasing the lock. This embodiment may seamlessly be integrated with existing systems.

Figure 1:
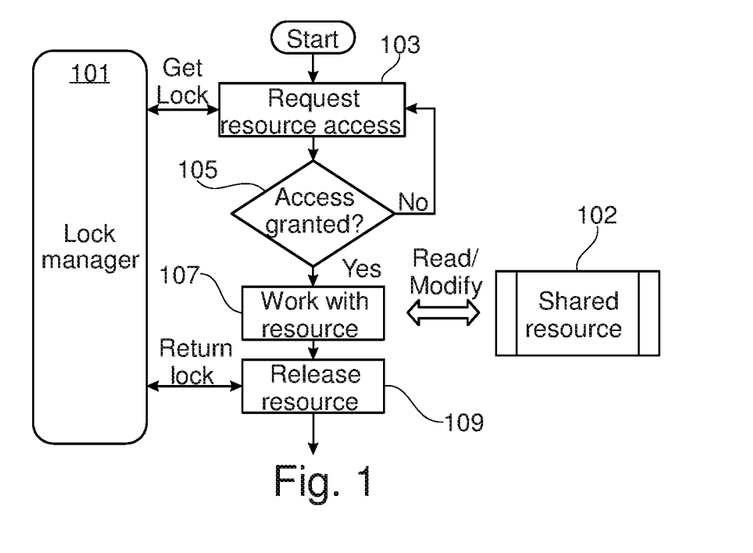
FIG. 1 is a diagram of a method for managing concurrent accesses by a synchronization module to a shared resource in accordance with a normal operation mode of the synchronization module.

FIG. 1 is a diagram of a method for managing, by a synchronization module, concurrent accesses to a shared resource 102 in accordance with a normal operation mode of the synchronization module. The synchronization module may be part of a computer system. The synchronization module may be configured to use a lock-based synchronization technique (or a locking mechanism). The synchronization module may be a lock manager 101 as shown in FIG. 1. The shared resource 102 may be associated with a lock. The lock may be an abstraction that allows at most one task to own it at a time. Access to the single resource 102 may be performed by obtaining the lock prior and as long as the lock is owned. The lock manager 101 grants the locks exclusively to parallel tasks and thereby guarantees, that the resource 102 is not accessed by two or more parallel tasks at the same time. FIG. 1 is further described with reference to FIG. 3A for simplification of the description.

Figure 3A:
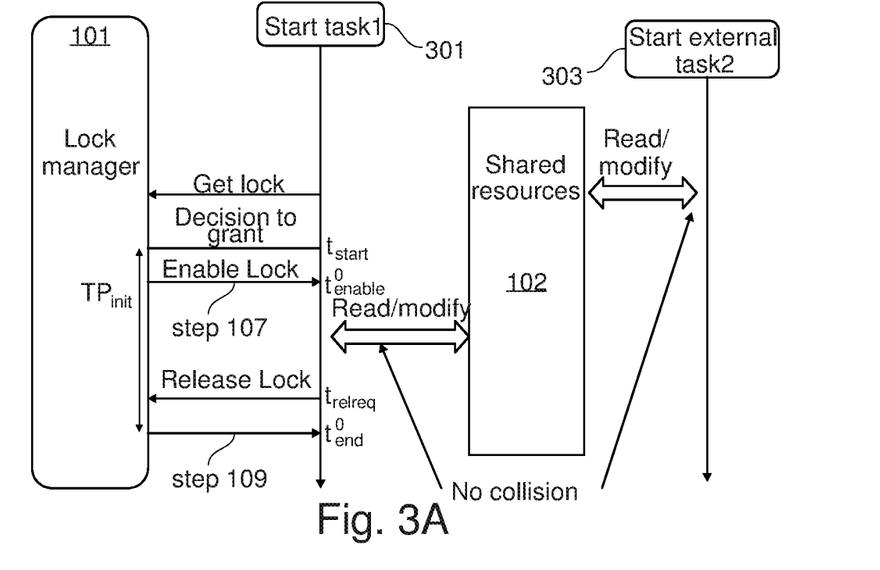
FIG. 3A is a diagram illustrating operation of the synchronization module in accordance with the normal operation mode.

The lock manager 101 may receive, in step 103, an access request for accessing the shared resource 102 by a task 301 of FIG. 3A. The access request comprises a request to acquire the lock. This may allow the task 301 to take ownership of the lock.

The lock manager 101 may determine (decision step 105) if the access can be granted to the task. This may, for example, be performed by determining if the lock is owned by another task or not. For example, if the lock is currently owned by another task, the task 301 may acquire the lock until the lock is released for the other task.

If (decision step 105) the access request cannot be granted to the task 301, the access request may be rejected and the task 301 may try again to acquire the lock. For example, while other tasks are owning the lock, the newly requesting task has to wait until the lock is granted.

If (decision step 105) the access request can be granted to the task, the lock manager 101 may assign the resource to the task in a resource assigning step 107. In other words, if the lock is not assigned to or owned by another task, the lock manager 101 may decide to grant the access to the task at a point of time $t_{start}$ as indicated in FIG. 3A. This may result in the shared resource being exclusively assigned by the lock manager 101 to the task 301 after $t_{start}$. The resource assigning step 107 may occur or be performed at a point of time $t_{enable}^o$ immediately after the decision to grant the access to the task 301. The time interval, named Response$_{t1}$, between $t_{start}$ and $t_{enable}^o$, Response$_{t1}$=[$t_{start}$, $t_{enable}^o$], may be the time required by the lock manager to respond to the task 301 after deciding to grant the lock to the task 301.

After completing the access to the resource 102, the task 301 may send a lock release request to the lock manager 101. Upon receiving the lock release request, e.g., at time $t_{relreq}$, the lock manager 101 may perform a resource releasing step 109 at a point of time $t_{end}^o$. The duration of the time interval Response$_{t2}$=[$t_{relreq}$, $t_{end}^o$] may be the time needed by the lock manager 101 to immediately perform the resource releasing step 109 upon receiving the lock release request. The resource releasing step 109 may comprise releasing the lock so that the task 301 is not an owner of the lock anymore. Thus, the shared resource 102 may be exclusively assigned to the task 301 during the access time period TP$_{init}$=[$t_{start}$, $t_{end}^o$]. The access time period may comprise an effective access time interval [$t_{enable}^o$, $t_{relreq}$] during which the shared resource is effectively used by the task 301 and additional time needed by the lock manager 101 to enable or release the shared resource for the task 301. The access to the shared resource may comprise writing data to and/or reading data from the shared resource.

Steps 103 to 109 may be repeated, during a test phase of the computer system, for each task of a set of concurrent tasks that concurrently access the shared resource 102 and which are managed by the synchronization module 101. For example, each task of the set of tasks may have its own time values $t_{start}$, $t_{enable}^o$, $t_{relreq}$ and $t_{end}^o$. During this test phase, the computer system may be configured to detect or identify external tasks that try to access the shared resource 101 while the shared resources being used by one of these concurrent tasks. However, the efficiency of detecting the external tasks may be too low due to the time assigned to the task 301 to access the shared resource and due the smaller number of tasks that can be used during the test phase. For example, FIG. 3A shows a situation when an external task 303 accesses the shared resource "outside" of this locking mechanism. That is, the task 303 is accessing the shared resource without asking for a permission by requesting a lock from the lock manager first. This is, for example, illustrated by task 303 of FIG. 3A which is not detected as it occurs at a given time range shifted from the time interval [$t_{enable}^o$, $t_{relreq}$] This may, for example, be due to a programming error. Since the normal timings with usual workloads as shown in FIG. 3A do not have a conflict or collision between the tasks 301 and 303, this programming error is not detected. In particular, the access time period of the task is so short that the task 303 may have more time where it can access the shared resource without colliding with the task 301. The task 303 is not colliding with the task 301 because the task 303 cannot be detected within the predefined threshold of the access time period. The task 303 may, for example, occur in a time interval where it may not be determined if a resulting data change in the shared resource is caused by a 'normal" task or by the task 303.

Hence, in the normal operation mode, the predefined time span in which the task 301 accesses the single resource is not positioned within the time needed for it to collide with the "unprotected" access of the task 303. Such timings are, usually, depending on a real customer scenario with workloads and stress brought to the system, which cannot be tested during development. The efficiency of the detection of these external tasks may be improved using the present subject matter, e.g., as described in FIG. 2.

Figure 2:
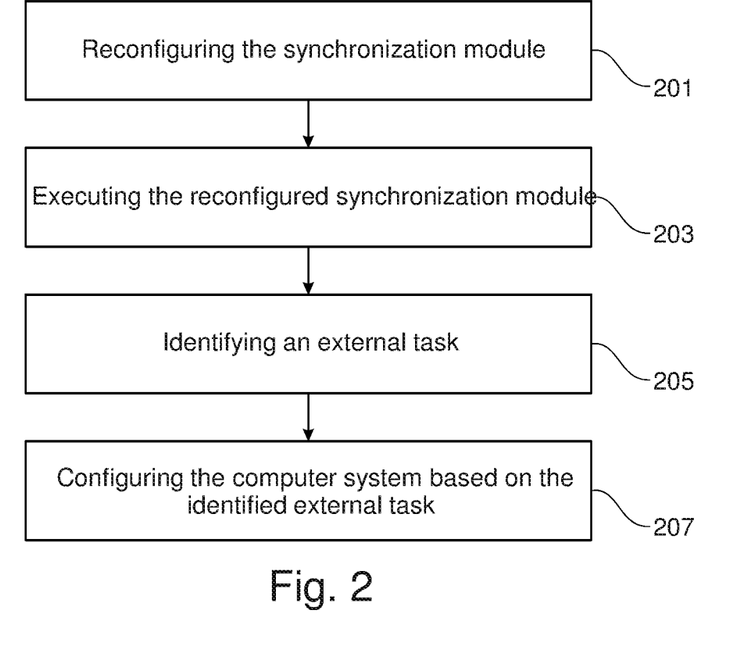
FIG. 2 is a flowchart of a method for managing concurrent accesses by a set of tasks to a shared resource of a computer system.

FIG. 2 is a flowchart of a method for managing concurrent accesses by a set of tasks to a shared resource of a computer system. The set of tasks may be managed by the synchronization module. The set of tasks may be tasks of a first type as they are managed by the synchronization module. The method of FIG. 2 may be described with reference to the implementation of FIGS. 3A-B for exemplification purpose, but it is not limited to that implementation. As described above, FIG. 3A shows the situation where the task 301 of the set of tasks is requesting access to the shared resource 102. This access request may be a request to get a lock used as a semaphore for the shared resource.

In step 201, the synchronization module such as the lock manager 101 may be reconfigured so that the resource assigning step 107 and/or the resource releasing step 109 are delayed by a delay period $\Delta t_1^j$ where j is an index, of the task 301, having a value between 1 and N, where N is the number of tasks of the set of tasks.

Each task j of the set of tasks may be associated with a distinct delay period $\Delta t^j$. For example, the concurrency between a given type of tasks may be more aggressive than for another type of tasks. In this case, the latter may be assigned a larger delay compared to the first. This may enable a flexible and accurate method for controlling the access time period assigned to each task.

Figure 3B:
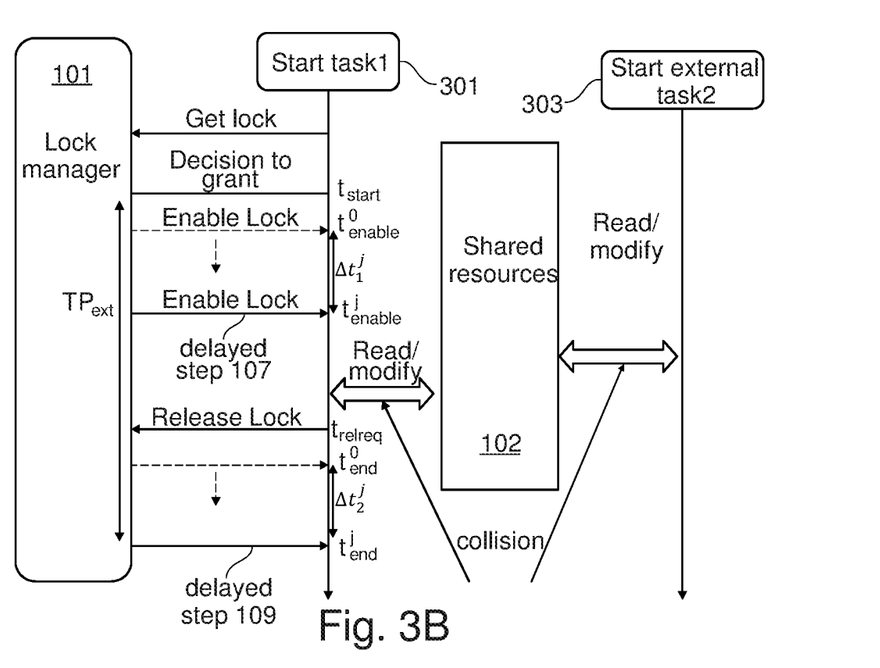
FIG. 3B is a diagram illustrating operation of the synchronization module in a test operation mode in accordance with the present subject matter.

Following the example of FIG. 3A, the delay of step 201 may be performed as follows. At least one of the two point of times $t_{enable}^o$ and $t_{end}^o$ may be delayed in step 201. This may result in new points of times $t_{enable}^j$ and $t_{end}^j$ as shown in FIG. 3B, where $t_{end}^j = t_{end}^o + \Delta t_2^j$ and $t_{enable}^j = t_{enable}^o + \Delta t_1^j$. Thus, the introduced delay may, for example, result in an extended access time period TP$_{ext}$=[$t_{start}$, $t_{end}^j$] or TP$_{ext}$= [$t_{start}$, $t_{end}^o$]. The resulting extended access time period TP$_{ext}$=[$t_{start}$, $t_{end}^o$] is the access time period TP$_{init}$ extended by $\Delta t_1^j$ because the usage of the resource by the task 301 is delayed as a result of delaying the resource assigning step 107. The introduced delay may also result in a shift of the time [$t_{enable}^o$, $t_{relreq}$] during which the shared resource is effectively used by the task 301. If both, the resource assigning step 107 and the resource releasing step 109 are delayed, then the delay period may be defined as $\Delta t^j = \Delta t_1^j + \Delta t_2^j$. In one example, $\Delta t_1^j = \Delta t_2^j$. In another example, $\Delta t_1^j$ may be different from $\Delta t_2^j$.

Thus, delaying the resource assigning step 107 may result in a longer duration of the response time indicated by the time interval Response$_{t1} = [t_{start}, t_{enable}^j]$ as illustrated in FIG. 3B. In other words, the delaying of the resource assigning step is performed such that the resource assigning step is not performed immediately after $t_{start}$. In addition, delaying the resource releasing step 107 may result in a longer duration of the response time indicated by the time interval Response$_{t2} = [t_{relreq}, t_{end}^j]$ as illustrated in FIG. 3B. In other words, the delaying of the resource releasing step is not performed immediately after the resource being requested to be released by the task.

In step 203, the reconfigured synchronization module may be executed. The execution of the reconfigured synchronization module may result, as shown in FIG. 3B, in each task of the set of tasks having an extended access time period $TP_{ext}$ and may result in a shift of the access time by each task to the shared resource as explained above.

In step 205, an external task that is trying to access the shared resource during the extended access time period may be identified. The external task may be a task of a second type that is not managed by the synchronization module. This is, for example, indicated in FIG. 3B, where the task 303 is now detected while the task 301 is assigned the shared resource because the access time period $TP_{init}$ has been extended to $TP_{ext}$.

The external task 303 that is trying to access the shared resource during the effective access time interval [$t_{enable}^j$, $t_{relreq}$] may be identified during the extended access time period. The external task 303 may be detected because as soon as there is a conflict between two tasks, the data may severely be corrupted. The detection may, for example, be performed by quality assurance (QA) tasks during a QA test. The synchronization module may be configured to execute the QA tasks for making sure that data used by (e.g. exchanged between) the set of tasks is not corrupted by the external task. During, the QA test of a product, testcases are run and the results are compared to expected results. Any data corruption may thereby be detected because the expected results do not fit with actual results anymore. For example, the set of information that can be corrupted in the shared resource may comprise a paragraph of text or numeric data which semantically belong together such as a bill with several price tags and the total sum, or an account statement which should correctly display a financial status. If such information is started to be changed by a first task, but the update was not finished by the first task while a second task reads it, then the read result is inconsistent. In another example, if the first task started with updates, and then the second task at the same time starts with updating, too, then the whole data set of the shared resource could become corrupted. As soon as the task 301 releases the lock, this means that it is done with writing to the shared resource and a later writing or reading of the task may not be critical anymore. Thus, the present subject matter may enable to find such unprotected programming errors before the product leaves manufacturing and by increasing the probability, during the QA phase, that potential collisions actually occur.

In step 207, the computer system may be configured for preventing accesses to the shared resource 102 by external tasks having a type of the identified external task 303. For example, a user may be prompted to debug the system using the identified task 303 and to provide inputs for configuring the system in step 207. During the execution of the method of FIG. 2, in particular steps 201 to 205, the synchronization module 101 may be in a test operation mode.

Figure 4:
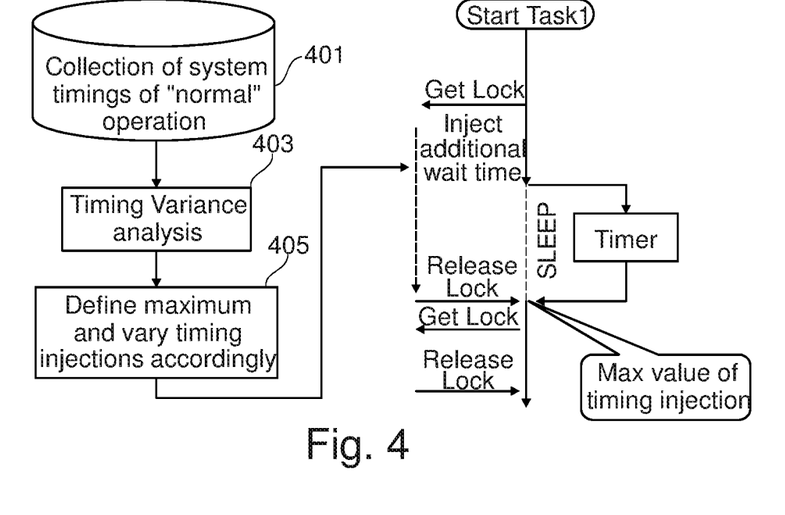
FIG. 4 is a diagram of a method for determining a delay period in accordance with an example of the present subject matter.

FIG. 4 is a diagram illustrating a method for determining a delay period $\Delta t^j$ in accordance with an example of the present subject matter. A database 401 may be created. The database 401 comprises collected timing information of the computer system using the synchronization module 101. The information may be collected by monitoring or observing the synchronization module 101 in the normal operation mode so that timing diagrams and statistics of all calls to the synchronization module 101 are collected. In case the synchronization module is a lock manager, the monitoring may be done by an instrumentation of a central locking manager API of the lock manager.

In step 403, a timing variance analysis may be performed. Based on the collected information in step 401, critical timing-patterns are identified. For example, using the collected information, individual calls of the lock manager API performed by a specific process/thread are analyzed, e.g., a stack trace at the time of the call and the timing difference to a next call to the lock manager for the same resource of the same process/thread may be done. Maximum boundaries of the timing patterns may have to be respected when defining the delay period $\Delta t^j$.

The result of the timing variance analysis may be used to inject in step 405 an additional wait time, i.e., delay period $\Delta t^j$ in the lock timing. The minimum of the measured timing distances is used in step 405 as the maximum of the lock-timing injection of a previous call as illustrated in FIG. 4. By this, the basic and fundamental timing needs of the computer system are preserved, but at the same time the possible gaps where other code parts could perform an "unprotected" access to the resource (i.e., without using the lock manager) are "occupied". In consequence a collision can be provoked without bringing the whole system down immediately. This method may enable to vary lock timing injections in a reasonable way, which allows for provoking coding errors in the computer system, without crossing boundaries which would stop the computer system immediately.

Figure 5:
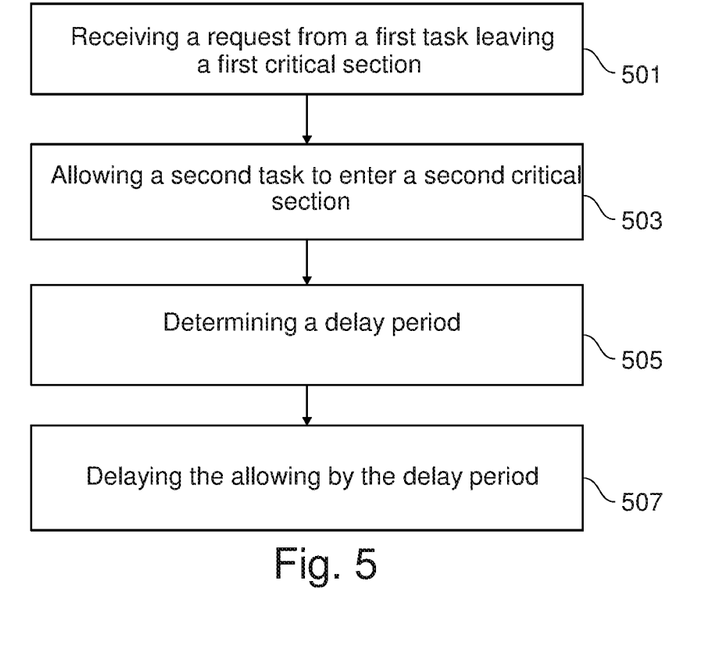
FIG. 5 is a flowchart of a method for managing concurrent accesses by a set of tasks to a shared resource of a computer system.

FIG. 5 is a flowchart of a method for managing a semaphore. The semaphore is associated with a resource e.g. 102 of a computer system to coordinate concurrent access to the same. In step 501, a request may be received from a first task leaving first critical section of the first task. A second task may be allowed in step 503 to enter a second critical section of the second task in response to the received request. In step 505, a delay period may be determined and the allowing of the second task to enter the second critical section may be delayed in step 507 by the delay period.

Figure 6:
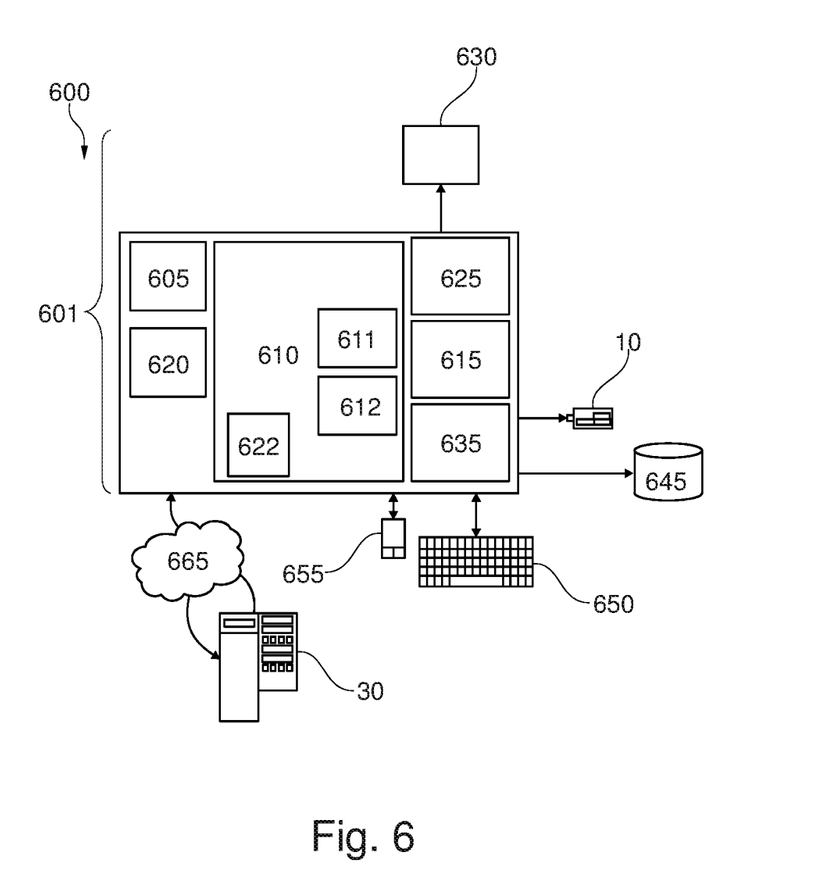
FIG. 6 represents a computerized system, suited for implementing one or more method steps as involved in the present subject matter.

FIG. 6 represents a general computerized system 600 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 612, 622 (including firmware 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 600 therefore includes a general-purpose computer 601.

In exemplary embodiments, in terms of hardware architecture, as shown in FIG. 6, the computer 601 includes a processor 605, memory (main memory) 610 coupled to a memory controller 615, and one or more input and/or output (I/O) devices (or peripherals) 10, 645 that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor-based microprocessor (in the form of a microchip or chip set), or generally any device for executing software instructions.

The memory 610 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 may include one or more separate programs, each of which comprises an ordered listing of executable instructions for implementing logical functions, notably functions involved in embodiments of the present invention. In the example of FIG. 6, software in the memory 610 includes instructions 612 e.g. instructions to manage databases such as a database management system.

The software in memory 610 shall also typically include a suitable operating system (OS) 411. The OS 611 essentially controls the execution of other computer programs, such as possibly software 612 for implementing methods as described herein.

The methods described herein may be in the form of a source program 612, executable program 612 (object code), script, or any other entity comprising a set of instructions 612 to be performed. When a source program, then the program needs to be translated via a compiler, assembler, interpreter, or the like, which may or may not be included within the memory 610, so as to operate properly in connection with the OS 611. Furthermore, the methods can be written as an object-oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 600 can further include a display controller 625 coupled to a display 630. In exemplary embodiments, the system 600 can further include a network interface for coupling to a network 665. The network 665 can be an IP-based network for communication between the computer 601 and any external server, client and the like via a broadband connection. The network 665 transmits and receives data between the computer 601 and external systems 30, which can be involved to perform part, or all of the steps of the methods discussed herein. In exemplary embodiments, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network W(LAN), a wireless wide area network (WWAN) a personal area network (PAN), a virtual private network (VPN), intranet or other suitable network system and includes equipment for receiving and transmitting signals.

If the computer 601 is a PC, workstation, intelligent device or the like, the software in the memory 610 may further include a basic input output system (BIOS) 622. The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software 612 stored within the memory 610, to communicate data to and from the memory 610, and to generally control operations of the computer 601 pursuant to the software. The methods described herein and the OS 611, in whole or in part, but typically the latter, are read by the processor 605, possibly buffered within the processor 605, and then executed.

When the systems and methods described herein are implemented in software 612, as is shown in FIG. 6, the methods can be stored on any computer readable medium, such as storage 620, for use by or in connection with any computer related system or method. The storage 620 may comprise a disk storage such as HDD storage.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

The invention claimed is:

1. A method for managing concurrent accesses by a set of tasks to a shared resource of a computer system, the method comprising:
   collecting timing pattern data during normal operation of a multi-threaded software synchronization module, the timing pattern data collected while the multi-threaded software synchronization module coordinates access by a set of calibration tasks to a shared resource;
   defining delay periods according to each calibration task type of the set of calibration tasks, each calibration task corresponding to a task type of a set of predefined task types;
   reconfiguring the multi-thread software synchronization module to coordinate access by a set of test tasks to the shared resource, each test task corresponding to a task type of the set of predefined task types, the set of test tasks being granted protected access during respective extended access time periods including corresponding delay periods according to the defined delay periods;
   identifying, during execution of the reconfigured multi-thread software synchronization module, a first external task and a first task type of the first external task during the respective extended access time periods, the first external task causing data to be corrupted; and
   configuring the computer system for preventing accesses to the shared resource by external tasks of the first task type.

2. The method of claim 1, wherein:
   the timing pattern data collected during normal operation is indicative of time gaps between consecutive accesses to the shared resource by different calibration tasks.

3. The method of claim 1, wherein:
   coordinating access to the shared resource by the multi-thread software synchronization module includes using a semaphore associated with the shared resource, the semaphore comprising a lock; and
   further comprising:
   assigning the shared resource to a first task by sending a message indicating a granting of access to the lock; and
   releasing the shared resource from a second task by releasing the lock.

4. The method of claim 1, wherein:
   the set of test tasks are of a second task type; and
   the first task type and the second task type are different types of tasks.

5. The method of claim 1, wherein the timing pattern data includes stack-trace information.

6. The method of claim 1, wherein the respective extended access time periods artificially enlarge normal operation lock timings only to an extent not exceeding a normal gap time span as demonstrated by the collected timing pattern data.

7. The method of claim 1, wherein the respective extended access time periods modify normal access times periods by delaying normal timing of one of a resource assignment or a resource release.

8. The method of claim 1, further comprising:
   executing the reconfigured multi-thread software synchronization module to perform the set of test tasks with quality assurance tasks for identifying data corruption events.

9. A computer program product comprising a computer-readable storage medium having a set of instructions stored therein which, when executed by a processor, causes the processor to manage concurrent accesses by a set of tasks to a shared resource of a computer system by:
   collecting timing pattern data during normal operation of a multi-threaded software synchronization module, the timing pattern data collected while the multi-threaded software synchronization module coordinates access by a set of calibration tasks to a shared resource;
   defining delay periods according to each calibration task type of the set of calibration tasks, each calibration task corresponding to a task type of a set of predefined task types;
   reconfiguring the multi-thread software synchronization module to coordinate access by a set of test tasks to the shared resource, each test task corresponding to a task type of the set of predefined task types, the set of test tasks being granted protected access during respective extended access time periods including corresponding delay periods according to the defined delay periods;
   identifying, during execution of the reconfigured multi-thread software synchronization module, a first external task and a first task type of the first external task during the respective extended access time periods, the first external task causing data to be corrupted; and
   configuring the computer system for preventing accesses to the shared resource by external tasks of the first task type.

10. The computer program product of claim 9, wherein:
    the timing pattern data collected during normal operation is indicative of time gaps between consecutive accesses to the shared resource by different calibration tasks.

11. The computer program product of claim 9, wherein:
    coordinating access to the shared resource by the multi-thread software synchronization module includes using a semaphore associated with the shared resource, the semaphore comprising a lock; and
    further comprising:
    assigning the shared resource to a first task by sending a message indicating a granting of access to the lock; and
    releasing the shared resource from a second task by releasing the lock.

12. The computer program product of claim 9, wherein the respective extended access time periods artificially enlarge normal operation lock timings only to an extent not exceeding a normal gap time span as demonstrated by the collected timing pattern data.

13. The computer program product of claim 9, wherein the respective extended access time periods modify normal access times periods by delaying normal timing of one of a resource assignment or a resource release.

14. The computer program product of claim 9, further comprising:
executing the reconfigured multi-thread software synchronization module to perform the set of test tasks with quality assurance tasks for identifying data corruption events.

15. A computer system comprising:
a processor set; and
a computer readable storage medium;
wherein:
the processor set is structured, located, connected, and/or programmed to run program instructions stored on the computer readable storage medium; and
the program instructions which, when executed by the processor set, cause the processor set to manage concurrent accesses by a set of tasks to a shared resource of a computer system by:
collecting timing pattern data during normal operation of a multi-threaded software synchronization module, the timing pattern data collected while the multi-threaded software synchronization module coordinates access by a set of calibration tasks to a shared resource;
defining delay periods according to each calibration task type of the set of calibration tasks, each calibration task corresponding to a task type of a set of predefined task types;
reconfiguring the multi-thread software synchronization module to coordinate access by a set of test tasks to the shared resource, each test task corresponding to a task type of the set of predefined task types, the set of test tasks being granted protected access during respective extended access time periods including corresponding delay periods according to the defined delay periods;
identifying, during execution of the reconfigured multi-thread software synchronization module, a first external task and a first task type of the first external task during the respective extended access time periods, the first external task causing data to be corrupted; and
configuring the computer system for preventing accesses to the shared resource by external tasks of the first task type.

16. The computer system of claim 15, wherein:
the timing pattern data collected during normal operation is indicative of time gaps between consecutive accesses to the shared resource by different calibration tasks.

17. The computer system of claim 15, wherein:
coordinating access to the shared resource by the multi-thread software synchronization module includes using a semaphore associated with the shared resource, the semaphore comprising a lock; and
further comprising:
assigning the shared resource to a first task by sending a message indicating a granting of access to the lock; and
releasing the shared resource from a second task by releasing the lock.

18. The computer system of claim 15, wherein the respective extended access time periods artificially enlarge normal operation lock timings only to an extent not exceeding a normal gap time span as demonstrated by the collected timing pattern data.

19. The computer system of claim 15, wherein the respective extended access time periods modify normal access times periods by delaying normal timing of one of a resource assignment or a resource release.

20. The computer system of claim 15, further comprising:
executing the reconfigured multi-thread software synchronization module to perform the set of test tasks with quality assurance tasks for identifying data corruption events.

* * * * *